June 16, 1925.
M. H. KOTZEBUE
GUDGEON FOR BULL WHEELS
Filed Jan. 22, 1924
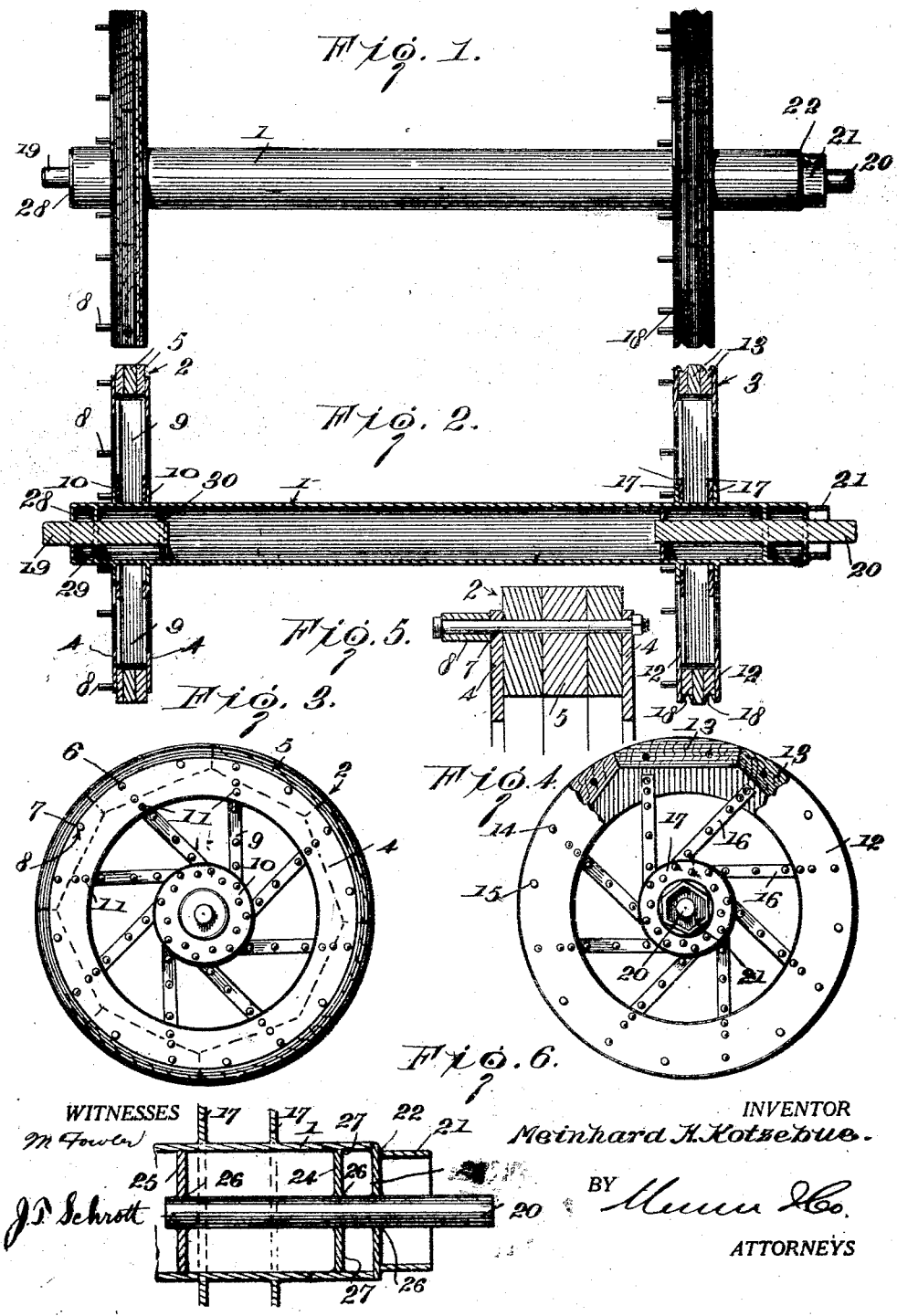
WITNESSES
M. Fowler
J. P. Schrott
INVENTOR
Meinhard H. Kotzebue.
BY
Munn & Co.
ATTORNEYS Patented June 16, 1925.

1,542,253

UNITED STATES PATENT OFFICE.

MEINHARD H. KOTZEBUE, OF TULSA, OKLAHOMA, ASSIGNOR OF THREE-FOURTHS TO WALKER S. ESTES, OF TULSA, OKLAHOMA.

GUDGEON FOR BULL WHEELS.

Application filed January 22, 1924. Serial No. 687,806.

*To all whom it may concern:*

Be it known that I, MEINHARD H. KOTZEBUE, a citizen of the United States, and resident of Tulsa, in the county of Tulsa and State of Oklahoma, have invented certain new and useful Improvements in Gudgeons for Bull Wheels, of which the following is a specification.

My invention relates to improvements in bull wheels for oil well drilling machinery and it consists of the constructions, combinations and arrangements herein described and claimed.

An object of the invention is to provide a strong but light bull wheel of such construction that failure of the wheel is insured against when used under high speeds, an additional feature of the wheel being that it can be transported in a knocked-down state and easily assembled without sacrificing any of the strength attributed to it.

A further object of the invention is to provide a bull-wheel for the purpose described having an improved gudgeon or journal.

A further object of the invention is to provide a bull-wheel having gudgeons of which one has a non-circular portion associated therewith for the purpose of receiving a sprocket so that the bull-wheel may be rapidly rotated as for the purpose of bailing a well.

Other objects and advantages will appear from the following specification, reference being had to the accompanying drawing, in which, Figure 1 is a side elevation of the improved bull-wheel, Figure 2 is a longitudinal section thereof, Figure 3 is an end elevation of the brake wheel at the left, Figure 4 is an end elevation of the tug wheel at the right, parts being shown broken away, Figure 5 is a detail section of a portion of the brake wheel showing how the turning pins are mounted, Figure 6 is a detail section of the improved gudgeon.

In carrying out the invention provision is made of a tubular shaft 1 upon which the brake and tug wheels 2 and 3 are mounted at the left and right ends respectively. Each is of a substantially similar construction, there being some differences, however, as presently noted.

The brake wheel 2 is composed of a pair of circular ring-like side plates 4 between which the wooden cants or fillers 5 are firmly secured by a circular series of bolts 6 and 7. These bolts occur in alternation (Figure 3) and are situated near the periphery of the side plates 4. Reason for the distinction between the bolts is this: The bolts 6 are approximately 8½ inches long, the bolts 7 approximately 11½ inches long. The first barely pass through the felly of the wheel and are only long enough to secure the side plates together. The second are additionally long enough to receive short pipe nipples 8 (Figure 5) thus providing handles or pins by means of which the bull-wheel may be manually turned.

Spokes 9 connect the felly with the hub of the brake wheel 2. The hub is composed of circular flanges 10 which are welded to the shaft 1. The spokes are composed of channel iron which are wide enough to fill the space between the circular plates 4 (see Figure 2). The spokes extend outwardly between the side plates to which they are suitably secured by bolts 11. The liberal use of bolts permits the dis-assembling of the brake wheel for purposes of transportation.

Reference is next made to the tug wheel 3. This wheel has circular side plates 12 like the plates 4 of the wheel 2, but differing therefrom in this respect that they are of somewhat greater diameter. The plates 12 reach to the periphery of the tug wheel, whereas the plates 4 fall short of the periphery of the brake wheel. These distinctions are clearly to be noted in Figure 2.

Cants or fillers 13 occupy the peripheral space between the plates 12, being secured in place by bolts 14 and 15 which offer the same distinction as the bolts 6 and 7 (Figure 3) in that the latter are longest and carry short pipe nipples providing pins by which manual turning is accomplished. Inasmuch as the arrangement of these pins is identical with that of the pins 8 of the brake wheel 3 (Figure 5) a detail drawing thereof is omitted.

Spokes 16 of wide channel iron connect the felly of the tug wheel with the hub which is composed of flanges 17 welded to the shaft 1. The tug wheel has a plurality of circumferential grooves 18 to which the rope is applied.

Considerable importance is attached to the particular construction of the journals or gudgeons 19 and 20. Both gudgeons are alike in construction. The gudgeon 20 has a hexagonal or other non-circular portion 21 associated therewith for the purpose of receiving a sprocket so that a tractor or other driving power may be used for turning the bull-wheel for bailing or other light pulling after the well has been completed.

This hexagonal gudgeon is welded at 22 (Figure 6) to the closure plate 23 of the hollow shaft 1. The welding 22 secures both the closure plate and the hexagonal gudgeon to the shaft.

The gudgeon 20 is supported by three steel disks of which the closure plate 23 is the outermost one. The other two disks 24 and 25 are situated on the interior of the tubular shaft. All three are welded to the gudgeon at 26. The closure plate 23 has already been described as being welded to the extremity of the hollow shaft 1. The disk 24 is also welded to the hollow shaft at 27. The periphery of the innermost disk 25 is not welded to the tubular shaft 1 but is merely fitted tightly inside of the shaft.

The two disks or plates 24 and 25 on the inside of the tubular shaft 1 assure the proper axial alinement of the gudgeon 20 with the gudgeon 19 at the opposite end. These disks, being composed of steel, provide sufficient flexibility of the gudgeons to prevent crystallization. Were the disks 23 and 24 relied upon to hold the gudgeon 20 in place the leverage of the gudgeon in respect to the tubular shaft 1 would be certain to disaline the former. The innermost and third disk 25 takes care of the leverage and positively holds the gudgeon in position.

All that has been said in respect to the gudgeon 20 at the right end of the shaft equally applies to the gudgeon 19 at the left. Briefly stated, this gudgeon has an outermost closure plate or disk 28, a second disk 29 and an innermost disk 30. These various disks are fitted in place both as regards the gudgeons and the shaft precisely as in the instance cited at the right.

A feature of no mean importance resides in the fact that use, and good use at that, is made of much material which would otherwise be wasted. The centers of the plates 4 and 12 are stamped out as clearly shown in Figures 3 and 4, but the materials of these centers is used to construct the various disks 23, 24, et cetera, which go toward making up the construction of the gudgeons. Mention has already been made of the fact that most of the bull-wheel parts are bolted together. The various spokes are bolted both to the felly plates 4 and 12 and also to the hub flanges 10 and 17. The cants or fillers of the brake and tug wheels are bolted in place and may be shipped either assembled or dis-assembled as may be most convenient. All of the various parts are accurately made in the first instance, and it requires no particular skill to assemble the entire bull wheel after the destination has been reached. It is further to be noted that the side or felly plates are whole. All piecing and riveting is entirely avoided.

While the construction and arrangement of the improved bull-wheel as herein described and claimed is that of a generally preferred form, obviously modifications and changes may be made without departing from the spirit of the invention or the scope of the claims.

I claim:—

1. A device of the character described comprising a tubular shaft, a gudgeon inserted in one end of the shaft, a pair of disks welded to the gudgeon in spaced relation one being welded to the shaft on the inside the other being of the same dimensions as the shaft and welded to the end thereof to provide a closure plate, and a third disk welded to the inner extremity of the gudgeon and having frictional engagement with the inside of the tubular shaft.

2. A device of the character described comprising a tubular shaft, a central gudgeon inserted in one end of the shaft, a pair of disks fastened upon the gudgeon in spaced relation one being welded to the inside of the shaft the other being of the same dimensions as the shaft and welded to the end thereof to provide a closure, a non-circular gudgeon abutting the closure disk and a third disk welded to the inner extremity of the central gudgeon and having a tight fit against the interior of the shaft.

MEINHARD H. KOTZEBUE.